(12) United States Patent
Maaref (10) Patent No.: US 10,110,348 B2
(45) Date of Patent: Oct. 23, 2018

(54) APPARATUS AND METHOD FOR MULTIMEDIA CONTENT TRANSMISSIONS IN MULTI-CHANNEL WIRELESS NETWORKS

(71) Applicant: Amine Maaref, Ottawa (CA)

(72) Inventor: Amine Maaref, Ottawa (CA)

(73) Assignee: HUAWEI TECHNOLOGIES Co., LTD., Shenzhen (CN)

( * ) Notice: Subject to any disclaimer, the term of this patent is extended or adjusted under 35 U.S.C. 154(b) by 172 days.

(21) Appl. No.: 15/005,669

(22) Filed: Jan. 25, 2016

(65) Prior Publication Data

US 2017/0214491 A1 Jul. 27, 2017

(51) Int. Cl.

| | | |
|---|---|---|
| *H04L 1/00* | (2006.01) | |
| *H04L 1/18* | (2006.01) | |
| *H04L 12/725* | (2013.01) | |
| *H04L 29/06* | (2006.01) | |

(Continued)

(52) U.S. Cl.
CPC .......... *H04L 1/0057* (2013.01); *H04L 1/1816* (2013.01); *H04L 45/302* (2013.01); *H04L 65/4076* (2013.01); *H04L 65/602* (2013.01); *H04L 65/607* (2013.01); *H04L 65/80* (2013.01); *H04W 16/14* (2013.01); *H04W 88/06* (2013.01)

(58) Field of Classification Search
CPC ... H04L 1/0057; H04L 1/1816; H04L 45/302; H04L 65/80; H04L 65/4076; H04L 65/602; H04L 65/607; H04W 16/14; H04W 88/06
See application file for complete search history.

(56) References Cited

U.S. PATENT DOCUMENTS

| | | | |
|---|---|---|---|
| 8,437,406 B2 * | 5/2013 | Kolze | .................... H04H 20/69 370/473 |
| 8,996,946 B2 | 3/2015 | Wu | |

(Continued)

FOREIGN PATENT DOCUMENTS

| | | |
|---|---|---|
| CN | 101433000 A | 5/2009 |
| CN | 103370896 A | 10/2013 |

(Continued)

OTHER PUBLICATIONS

Ahmad, S., et al., "Adaptive Unicast Video Streaming with Rateless Codes and Feedack," IEEE Transactions on Circuits and Systems for Video Technology, 13 pages, Sep. 2009.

(Continued)

*Primary Examiner* — Peter Chau (57) ABSTRACT

Methods and apparatuses are disclosed for encoding and transmitting video or multimedia content in wireless communications networks. The methods include encoding a block of input symbols using upper layer rateless forward error correction (FEC) codes to generate a plurality of encoded packets. The rateless FEC codes may be layer-aware or may incorporate unequal error protection (UEP). The input symbols represent one or more layers of scalable encoded video or multimedia content. Each of the plurality of encoded packets is transmitted over a selected one of a plurality of wireless channels. The wireless channel is selected based on an importance level of the input symbols in the encoded packet exceeding a threshold. The threshold may vary dynamically based on conditions in the networks.

30 Claims, 8 Drawing Sheets

(51) Int. Cl.
*H04W 16/14* (2009.01)
*H04W 88/06* (2009.01)

(56) References Cited

U.S. PATENT DOCUMENTS

| | | | |
|---|---|---|---|
| 2002/0102977 A1* | 8/2002 | Shi | H04W 36/30 455/437 |
| 2003/0200499 A1* | 10/2003 | Khayrallah | H04L 1/0009 714/776 |
| 2005/0246417 A1* | 11/2005 | Raith | H04L 1/0017 709/203 |
| 2006/0259627 A1* | 11/2006 | Kellerer | H04L 29/06 709/227 |
| 2007/0099641 A1 | 5/2007 | Lastinger et al. | |
| 2009/0219990 A1* | 9/2009 | Han | H04L 1/0007 375/240.02 |
| 2012/0131407 A1* | 5/2012 | Chiao | H03M 13/356 714/751 |
| 2012/0246538 A1* | 9/2012 | Wu | H03M 13/3761 714/752 |
| 2014/0250344 A1* | 9/2014 | Hellge | H04L 1/007 714/755 |
| 2015/0078460 A1* | 3/2015 | Hu | H04N 19/67 375/240.27 |
| 2015/0131536 A1 | 5/2015 | Kaur et al. | |
| 2015/0215133 A1* | 7/2015 | Cao | H04L 65/607 370/312 |
| 2015/0256303 A1 | 9/2015 | Belghoul et al. | |
| 2015/0319464 A1* | 11/2015 | Hellge | H04N 19/46 375/240.27 |
| 2015/0326612 A1 | 11/2015 | Faccin et al. | |
| 2015/0334643 A1* | 11/2015 | Maaref | H04W 48/18 370/329 |
| 2015/0358919 A1* | 12/2015 | Chen | H04B 7/0434 370/329 |
| 2017/0181040 A1* | 6/2017 | Chandwani | H04W 28/26 |

FOREIGN PATENT DOCUMENTS

| | | |
|---|---|---|
| CN | 104185187 | 12/2014 |
| CN | 104918335 A | 9/2015 |
| CN | 104994513 | 10/2015 |
| WO | 2013154546 A1 | 10/2013 |

OTHER PUBLICATIONS

Ahmad, Shakeel, et al., "Unequal Error Protection Using Fountain Codes with Applications to Video Communication," IEEE Transactions on Multimedia, vol. 13, No. 1, pp. 92-101, Feb. 2011.

Byers, J., et al. "A Digital Fountain Approach to Reliable Distribution of Bulk Data," (ftp://ftp.icsi.berkeley.edu/pub/techreports/1998/tr-98-013.pdf), 15 pages, 1998.

Cataldi, P., et al., "Sliding-Window Raptor Codes for Efficient Scalable Wireless Video Broadcasting With Unequal Loss Protection," IEEE Transactions on Image Processing, vol. 19, No. 6, pp. 1491-1503, Jun. 2010.

Choi, M., et al. "Reliable Video Multicast over Wi-Fi Networks with Coordinated Multiple APs," INFOCOM, 2014 Proceedings IEEE, 9 pages, Apr.-May, 2014.

Ericsson, "On the Pulse of the Networked Society", Ericsson Mobility Report, pp. 1-32, Nov. 2014.

Hellge, C., "Layer-Aware Forward Error Correction for Mobile Broadcast of Layered Media," IEEE Transactions on Multimedia, vol. 13, No. 3, pp. 551-562, Jun. 2011.

Kushwaha, H., et al., "Reliable Multimedia Transmission Over Cognitive Radio Networks Using Fountain Codes," Proceedings of the IEEE, vol. 96, No. 1, pp. 155-165, Jan. 2008.

Pandya, A., et al., "AL-FEC Raptor Code Implementation Over 3GPP eMBMS Network", International Journal of Electronics & Communication Technology, vol. 4, Issue SPL-4, pp. 37-42, Apr.-Jun. 2013.

Vukobratović, D., et al., "Scalable Video Multicast Using Expanding Window Fountain Codes," IEEE Transaction on Multimedia, vol. 11, No. 6, pp. 1094-1104, Oct. 2009.

Wagner, Jean-Paul, et al., "Streaming of Scalable Video From Multiple Servers Using Rateless Codes," 2006 IEEE International Conference on Multimedia and Expo, pp. 1501-1504, Jul. 9-12, 2006.

* cited by examiner

APPARATUS AND METHOD FOR MULTIMEDIA CONTENT TRANSMISSIONS IN MULTI-CHANNEL WIRELESS NETWORKS

TECHNICAL FIELD

The present application relates to wireless communications and specifically, methods and systems for transmitting video content in a wireless communications system.

BACKGROUND

There are increasing demands for supporting multicast applications in which users may request the same video content. This video content may contain location information, news, or advertisements at hot spots such as sports venues and airports, or lecture or training information in a classroom. Video content may be transmitted in conjunction with high definition voice content, such as for video conferencing services. Video content can be delivered to multiple user devices via multicast or broadcast methods which frees up bandwidth resources that can be used to support other services. Multicast and broadcast transmissions over wireless networks are challenging, however, due to packet losses caused by the wireless channel and device mobility. It is also difficult to multicast real-time video with differentiated quality of service (QoS) or quality of experience (QoE).

Many devices currently support different types of network interfaces for communications between the device and various wireless networks. Some networks operate over a licensed wireless spectrum which is regulated and has portions allocated to different entities in a geographic area. Such networks typically are operated by a carrier or network service provider, may have access controls or service level agreements, and may require fees in order to receive services. Fees also may apply based on the quality of service requested. In other networks, devices share a range of unlicensed wireless spectrum. Such networks may or may not have access controls or service level agreements, and typically do not require fees for wireless connections between devices and a network access point.

Various systems have been proposed in order to enable a device to access and receive services from two or more different networks. The device may operate in one network typically operated by a carrier or service provider over licensed frequencies, such as mobile or cellular communications networks based on 5G, 4G, and Long Term Evolution (LTE) standards and related technologies. The device also may be able to access and receive services from a network typically operating over unlicensed frequencies, such as wireless local area network operating according to a standard such as IEEE 802.11 or WiFi™. In some cases, data communications are simply offloaded to the network operating over unlicensed frequencies. In other cases, the benefits of a carrier-type air interface and services provided for mobile or cellular networks over licensed spectrum may be extended to also provide and manage the services over the unlicensed spectrum. These extended or assisted communications may be referred to as licensed assisted access (LAA).

SUMMARY

In one embodiment, the present application discloses a method for transmitting multimedia content which includes encoding a block of input symbols using upper layer rateless forward error correction (FEC) codes to generate a plurality of encoded packets. The input symbols represent one or more layers of scalable encoded multimedia content. The method includes transmitting each of the plurality of encoded packets over a selected one of a plurality of wireless channels. The wireless channel is selected based on an importance level of the input symbols in the encoded packet exceeding a threshold.

In one embodiment, the present application discloses an apparatus for transmitting multimedia content over a plurality of wireless communications channels. The apparatus consists of a packet generation module configured to encode a block of input symbols using upper layer rateless forward error correction (FEC) codes to generate a plurality of encoded packets. The input symbols representing one or more layers of scalable encoded multimedia content. The apparatus includes a scheduler configured to assign each of the plurality of encoded packets to a selected one of a plurality of wireless channels based on an importance level of the input symbols in the encoded packet exceeding a threshold. The apparatus also includes a transmitter configured to transmit the encoded packets over the selected wireless channels.

In one embodiment, the present application discloses a wireless user device which consists of a multiband receiver configured to receive a plurality encoded packets over multiple wireless channels, the encoded packets have upper layer rateless forward error correction (FEC) codes. The apparatus includes a processor configured to decode the upper layer FEC codes.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. Although aspects of the invention will be described in conjunction with the illustrated embodiments, it will be understood that it is not intended to limit the invention to such embodiments.

DETAILED DESCRIPTION OF EXAMPLE EMBODIMENTS

Methods, apparatuses and systems are described herein for multicast transmissions of video content using scalable video coding (SVC) or multiview video coding (MVC) techniques and rateless upper-layer FEC (forward error correction) codes. Unequal error protection (UEP) also may be applied as part of the FEC encoding. Different equal error protection methods may be modified to produce UEP within the FEC algorithm. The encoding occurs at an upper layer, such as an application or radio link control (RLC) layer. The encoded data is assigned for transmission over multiple spectrum channels, such as through a licensed channel or an unlicensed channel. The assignment or scheduling is done according to importance of information contained within each encoded packet. A packet which represents only information from a base layer of SVC video content, or which represents a large portion of information from the base layer, may be transmitted over a channel having a known or expected quality of service, such as a licensed wireless channel. A packet which represents only information from an enhancement layer of SVC video content, or which represents a smaller portion of information from the base layer, may be transmitted over a channel having a unknown quality of service, such as an unlicensed wireless channel. The methods, devices and systems described herein also may be used for the transmission of high definition (HD) voice. HD voice is also referred to as wideband audio or adaptive multi-rate wideband (AMR-WB). In some cases, HD voice content is transmitted in conjunction with video conferencing services.

Figure 1:
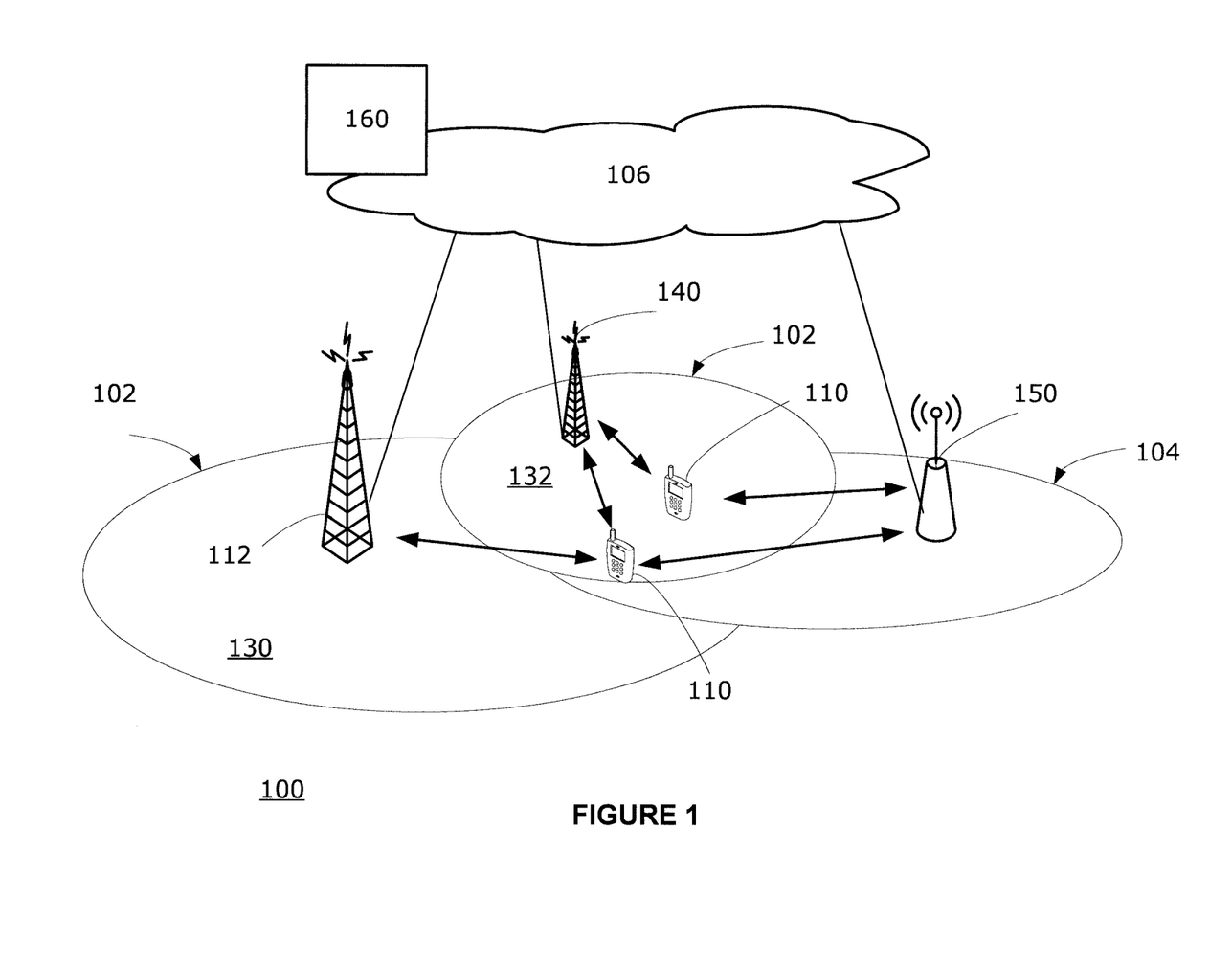
FIG. 1 is a diagram illustrating an example communications system in accordance with one implementation of the present disclosure.

FIG. 1 illustrates a communications system 100 which includes a number of different wireless networks 102, 104 connected through a backhaul network 106. The system 100 includes a plurality of user devices 110 which received services from the networks 102, 104.

The user device 110 is generally any device capable of providing wireless communications such as a user equipment (UE), wireless transmit/receive unit (WTRU), mobile station (MS), mobile terminal, smartphone, cellular telephone, or other wireless enabled computing device. The user device 110 includes one or more communications interfaces to enable the user device 110 to communicate with the networks 102, 104.

The wireless network 102 may operate according to one or more access technologies such as frequency division multiple access (FDMA), single-carrier FDMA (SC-FDMA), orthogonal FDMA (OFDMA), or sparse code multiple access (SCMA), and communications or interface standards including but not limited to fifth generation (5G) or fourth generation (4G) telecommunications networks, 3rd Generation Partnership Project (3GPP) Long-Term Evolution (LTE), or 3GPP Long-Term Evolution advanced (LTE-A).

The network 102 may provide services through one or more network nodes 112. The network node 112 may be a base station (BS), evolved Node B (eNB), or other network interface which functions as a wireless transmission and/or reception point for user devices 110 in the network 102. The network node 112 may operate with different transmitting and receiving capabilities creating service areas or cells of different sizes, which may be referred to as macro cells and small cells, micro cells, pico cells or femto cells. Smaller cells may be serviced by a lower power network node (LPN). For illustration purposes, a macro-cell 130 and small cell 132 are shown in FIG. 1 with an LPN 140 serving the small cell 132 and a network node 112 serving the macro-cell 130. Wireless communications with one or more user devices 110 thus may be supported over a range from a few meters to tens or hundreds of kilometers. As a result, the frequencies used in the network 102 may be licensed or managed to allow multiple networks 102 to coexist within a geographic area. In some embodiments, the network 102 operates at frequencies in the range of 700 MHz to 2.6 GHz.

The wireless network 104 may be a wireless local area network (WLAN), such as a network operating according to the IEEE 802.11 standard or WiFi™. Services are provided through one or more network access points 150. The access point 150 may have a wired connection to the backhaul network 106 though a server (not shown) which enables data to be exchanged between the access point 150 and other remote networks, nodes, access points, and devices (not shown). Each access point 150 may communicate with one or more user devices 110 within a range of a few meters and multiple access points 150 may be used to extend the coverage of the WLAN network 104. While shown as separate, it will be appreciated that the user device 110 or another computer device (not shown) may also operate as an access point 150. Communications in the WLAN network 104 typically have restrictions on transmitter power and thus are local, typically extending within a home, office, building or the like. The provision of such networks is unlicensed, meaning that permission from a regulatory body is not required for a person or entity to operate a WLAN network 104, and an allocation of specific frequencies to each network operator is not required. WLAN networks 104 may operate in frequency bands between 2.4 to 6.0 GHz.

Communications to and from a user device 110 through the network 104 may be used to offload or reduce the services, bandwidth and amount of data the user device 110 requires through the network 102. In some cases, communications over the unlicensed channels in the network 104 may be sent or received by the user device 110 according to the wireless local area network or WiFi™ interface or protocol requirements. In some cases, the bandwidth available to the user device 110 through the network 104 may be used or managed by an operator of the network 102. In this scenario, communications over the unlicensed channels in the network 104 may be sent to and by the user device 110 according to the interface requirements or protocol for a cellular or LTE network. This latter type of service for a user device 110 in an LTE network 102 over the wireless resources typically allocated to a WLAN network 104 is also known as license-assisted access (LAA).

The system 100 includes a server 160 which provides video content or multimedia content to one or more user devices 110. The server 160 may be part of a network server or network controller (not shown) in the backhaul network 106. The server 160 may also be part of the network node 112, the LPN 140 or the access point 150. In some embodiments, a user device 110 also may be configured to operate as a server 160 to provide video or multimedia content to other user devices 110. The server 160 encodes video or multimedia content for transmission through the networks 102, 104 to a plurality of user devices 110. The transmission of video or multimedia content may include unicast, broadcast or multicast transmissions.

The present application describes new methods and apparatuses for encoding and transmitting video or multimedia content. The new methods are particularly suited for broadcast or multicast transmissions in which each user device 110 which receives the content may have a different wireless channel quality due to variable network conditions. The new methods are also suited for transmitting video or multimedia content to meet different quality of service (QoS) and quality of experience (QoE) requirements associated with each user device 110. The new methods may be used for streaming delivery of video or audio, or for content delivery, such as to transmit the video content for a multimedia file download.

Figure 2:
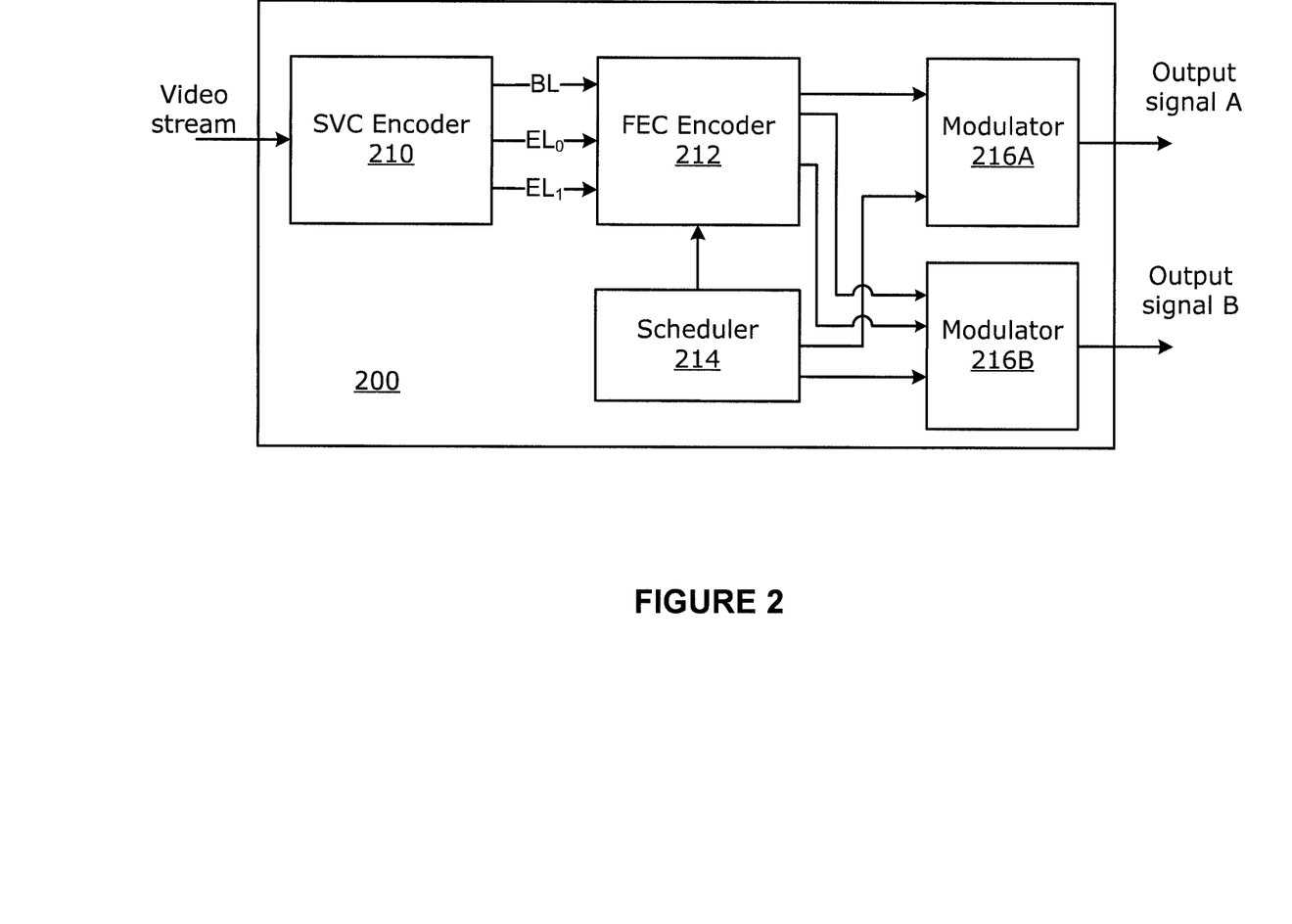
FIG. 2 is a block diagram illustrating an example packet generation module in accordance with one implementation of the present disclosure.

FIG. 2 illustrates a packet generation module 200 according to an example embodiment. In one embodiment, the packet generation module 200 includes an SVC encoder 210 which receives an input video stream and encodes the stream using an SVC codec. In one embodiment, the SVC encoder 210 operates according to the H.264/MPEG-4 AVC video compression standard. The SVC encoder 210 generates a base layer (BL) and one or more enhancement layers (EL) of encoded video, as represented by BL and $EL_0$ and $EL_1$ in FIG. 2. The input stream may be divided into multiple code blocks and each code block may include symbols from one or more of the BL, $EL_0$, and $EL_1$. Two ELs are shown for illustration purposes but the SVC encoder 210 may be configured to produce any number of enhancement layers. Using SVC encoding, if the base layer is received and decoded by a user device 110, the device 110 may be able to play the video content with a base or minimum level of quality. If one or more enhancement layers $EL_0$, $EL_1$, are also received and decoded by the device 110, the quality of the video playback may be enhanced.

The code block generated by the SVC encoder 210 is further encoded by an FEC encoder 212. The FEC encoder 212 operates at an upper layer to generate an encoded packet of video content. An upper layer is any layer above the physical layer, such as an application layer or radio link layer (RLC). In one embodiment, blocks of each of the BL, $EL_0$, $EL_1$, are encoded by a basic or layer-aware (LA) FEC algorithm which preserves the interdependency of the layers. In this embodiment, unequal error protection (UEP) may be used when generating parity symbols for each layer. In other embodiments, the input to the FEC encoder 212 is a block of data which consists of a group or mix of input symbols from one or more of the layers BL, $EL_0$, $EL_1$. In this embodiment, UEP may be used within the FEC algorithm as described in further detail below.

The packet generation module 200 includes a scheduler 214 which assigns the encoded packets for transmission over one or one or more physical channels which are available in the communications system 100. According to the scheduler 214, some packets may be assigned to a modulator 216A for modulation and transmission of output signal A over a wireless channel, such as a channel operating over a licensed band or frequency in the network 102. Some packets may be assigned to a modulator 216B for modulation and transmission of output signal B over a wireless channel, such as a channel operating over an unlicensed band or frequency in the network 104. While two modulators 216A, 216B are illustrated in FIG. 2, additional modulators may be present. For example, additional modulators 216 may be present to transmit packets over an unlicensed channel using a WLAN or WiFi™ interface and to also transmit packets over an unlicensed channel using a cellular or LTE interface.

As described in further detail below, depending on the content of the encoded packet, and the importance or priority level of information represented by the encoded packet, the scheduler 214 assigns the packet to an appropriate modulator 216A, or 216B for transmission over the associated wireless channel. In one embodiment, the encoded packet is assigned to a selected channel and modulator based on an importance level of the input symbols in the encoded packet exceeding a threshold. For example, if the encoded packet represents data only from the base layer, the encoded packet likely exceeds this threshold and is transmitted over a licensed wireless channel in the network 102 since the quality of service may be controlled within the network 102.

In another example, the encoded packet may represent data from the base layer and one more enhancement layers. If the amount of information in the packet from the base layer is small or if there is no information from the base layer, the threshold is not exceeded. The scheduler 214 may assign the packet to be transmitted over an unlicensed wireless channel in the network 104. Since the receipt of this packet by the user device 110 is less important, it may be transmitted over a channel in the network 104 which has an unknown or uncontrolled quality of service. The threshold used by the scheduler 214 may be preset or it may be configured dynamically based on conditions in the network 102, conditions in the network 104, the QoS requirements of the user device 110, the QoS requirements of the video or multimedia application, the QoE requirements of the user device 110, or combinations thereof. Thus, for example, if the quality of signals over the unlicensed wireless channel decreases, and/or if the quality of signals over the licensed wireless channel improves, the threshold may be decreased so that more packets are assigned for transmission over the licensed wireless. Alternatively, if the quality of signals over the unlicensed wireless channel improves, the threshold may be increased so that more packets are assigned for transmission over the unlicensed wireless channel.

The packet loss rates over the licensed and unlicensed wireless channels are difficult to predict due to variable network conditions. Further, if the video or multimedia transmission comprises a broadcast or multicast transmission, different user devices 110 also may experience varying network conditions when receiving data over different licensed and unlicensed wireless channels. Thus, the amount of redundancy required over each channel and possible code rates are difficult to determine. As a result, the upper layer FEC encoder 212 operates using fountain codes which are rateless codes suitable for erasure channels. The use of fountain codes enables an unlimited number of encoded symbols and packets to be generated from a group of input symbols. In one embodiment, a Luby transform (LT) fountain code may be used. In embodiments using an LA-FEC algorithm, Raptor codes may be used. Other types of rateless codes can also be used.

As long as the user device 110 receives a sufficient number of encoded packets, the user device 110 can decode and recover the original input symbols regardless of which subset of encoded packets the user device 110 received. The encoded packets may be transmitted by the packet generation module 200 until an acknowledgement is received from the user device 110 confirming the receipt of the packet. In one embodiment, if an acknowledgement is not received from the user device 110 within a predetermined time period, or after the transmission of a predetermined number of packets, the scheduler 214 may alter the assignment of packets. For example, packets which would be assigned to the modulator 216B for transmission over an unlicensed wireless channel in the network 104, based on the threshold described above, may be assigned to the modulator 216A for transmission over a licensed channel in the network 102. Assuming that the network 102 may better control the quality of services provided over licensed channels, the likelihood of successful delivery is improved by the re-assignment of packets.

Figure 3:
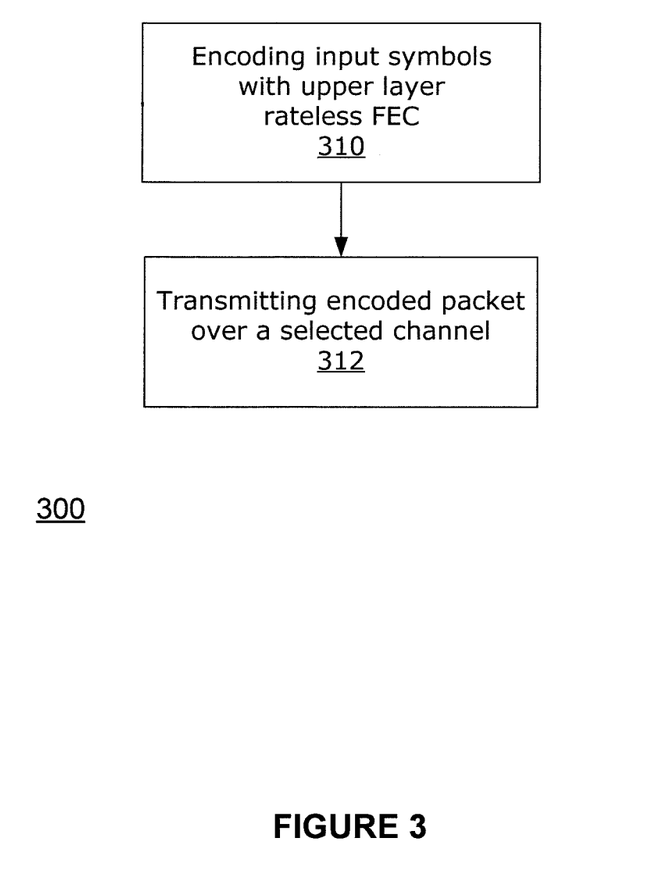
FIG. 3 is a block diagram illustrating a method in accordance with one implementation of the present disclosure.

FIG. 3 illustrates a method 300 according to one example embodiment for encoding and transmitting video content. The method includes encoding (Action 310) a block of input symbols. In one embodiment, the input symbols represent one or more layers of SVC encoded video content. The encoding may be performed at an upper layer using rateless FEC encoding as described above. In some embodiments, the encoding may incorporate UEP measures. The method includes transmitting (Action 312) an encoded packet over a selected wireless channel. The wireless channel may be selected from a plurality of channels available in the system 100. The encoded packets may be transmitted over licensed channels using a cellular or LTE communications protocol. In some embodiments, the encoded packets may be transmitted over unlicensed channels, including unlicensed channels shared with a wireless local area network (WLAN), using the cellular communications protocol. In some embodiments, the encoded packets may be transmitted over unlicensed channels using the WLAN communications protocol. As described herein, the wireless channel is selected based a threshold. The threshold may be predetermined or configured dynamically based on the importance or priority level of information represented by the encoded packet, conditions in the network 102, conditions in the network 104, the QoS requirements of the user device 110, the QoS requirements of the video or multimedia application, the QoE requirements of the user device 110, or combinations thereof.

In one embodiment, the method 300 includes transmitting the threshold information as part of, or along with, the transmission of encoded packets. The threshold information may be received and used by the user device 110 to determine which wireless channels have been used for the transmission of data. Based on the threshold, the user device 110 may determine a monitoring action for each channel. For example, if the threshold is low, and most packets are being transmitted over the licensed wireless channel, the user device 110 may not actively monitor any unlicensed wireless channels for the video or multimedia content. By not monitoring all channels, the user device 110 may use less power. In some embodiments, the monitoring of channels by the user device 110 may depend on its QoS and/or QoE requirements. For example, if the threshold indicates that most but not all packets are expected to be received by the user device 110 over the licensed wireless channel, and the user device 110 has low QoS and/or QoE requirements for this transmission, the user device 110 may not actively monitor any unlicensed wireless channels.

The user device 110 includes a multiband receiver in order to receive packets over the multiple licensed and unlicensed wireless channels. The user device 110 may be configured to receive packets over an unlicensed channel using a WLAN or WiFi™ interface and/or to receive packets over an unlicensed channel using a cellular or LTE interface. The user device 110 may be configured to decode the jointly fountain encoded data received over the licensed and unlicensed wireless channels using a message passing algorithm (MPA). The received packet may be decoded at an upper layer, such as a corresponding RLC or application layer using an unequal error protection rateless decoder. In one embodiment, the user device 110 includes a multi-band or multi-channel scalable content decoder to decode the UEP rateless codes received across multiple bands.

The user device 110 may send an acknowledgement to confirm once the block of video content has been successfully received and decoded. In some examples, the user device 110 may provide an acknowledgement for the successful recovery of the original information signals corresponding to different layers of the SVC encoded data. In a multicast transmission, for example, where user devices 110 receiving the video content have different capabilities and different QoS and/or QoE requirements, different acknowledgments may be provided. Thus, QoS differentiation may be supported for the multicast transmission. In some embodiments, the user device 110 may send an acknowledgment after successfully decoding a base layer for the transmission. A user device 110 with more processing capabilities and greater QoS and/or QoE requirements may send an acknowledgement after successfully decoding the base layer and one or more enhancement layers. In one embodiment, the user device 110 sends an acknowledgement after successfully decoding a certain number of enhancement layers. This number may depend, for example, on the QoS/QoE requirements of the user device 110 for this content.

Figure 4:
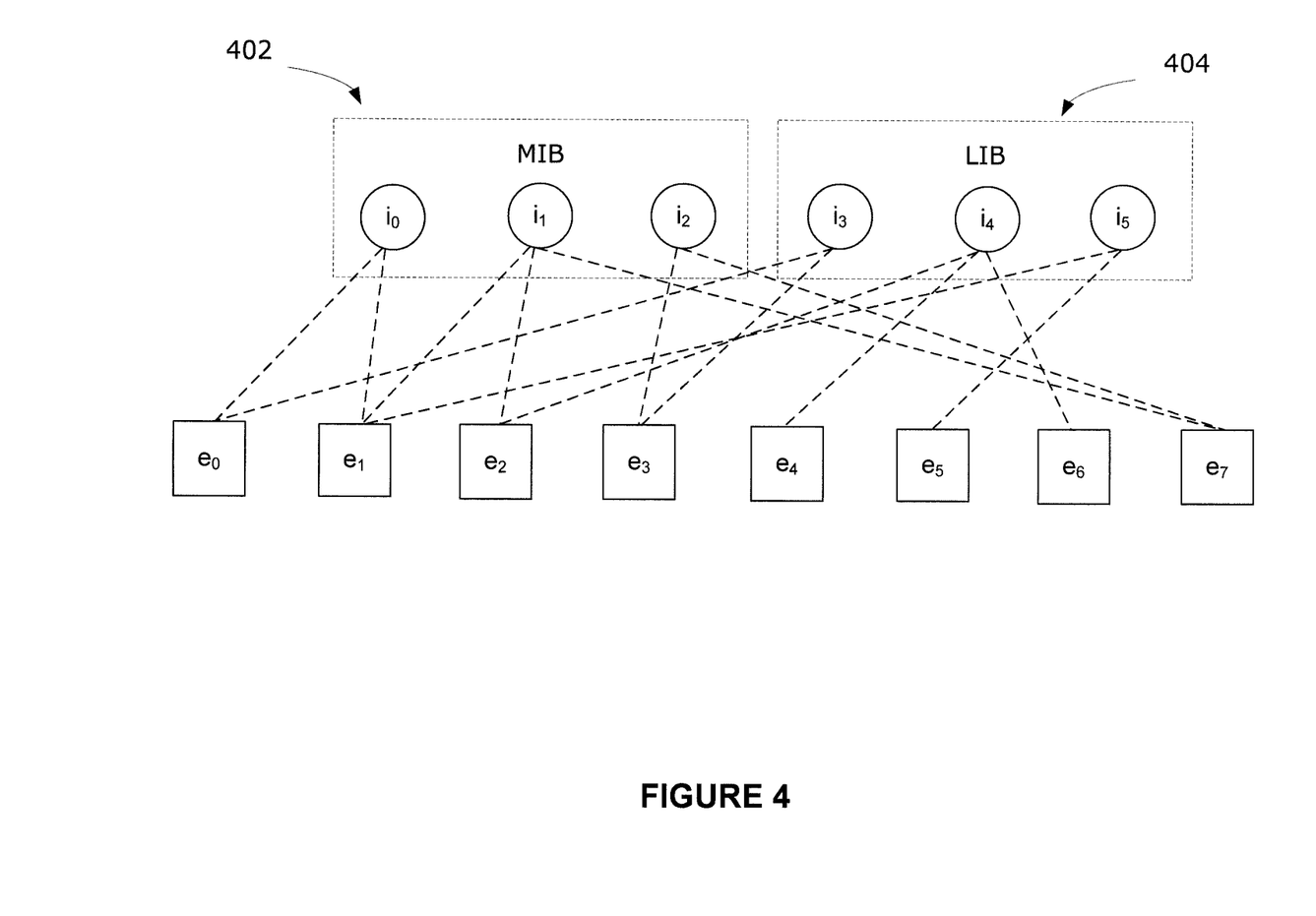
FIG. 4 is a diagram illustrating an example encoding process in accordance with one implementation of the present disclosure.
Figure 5:
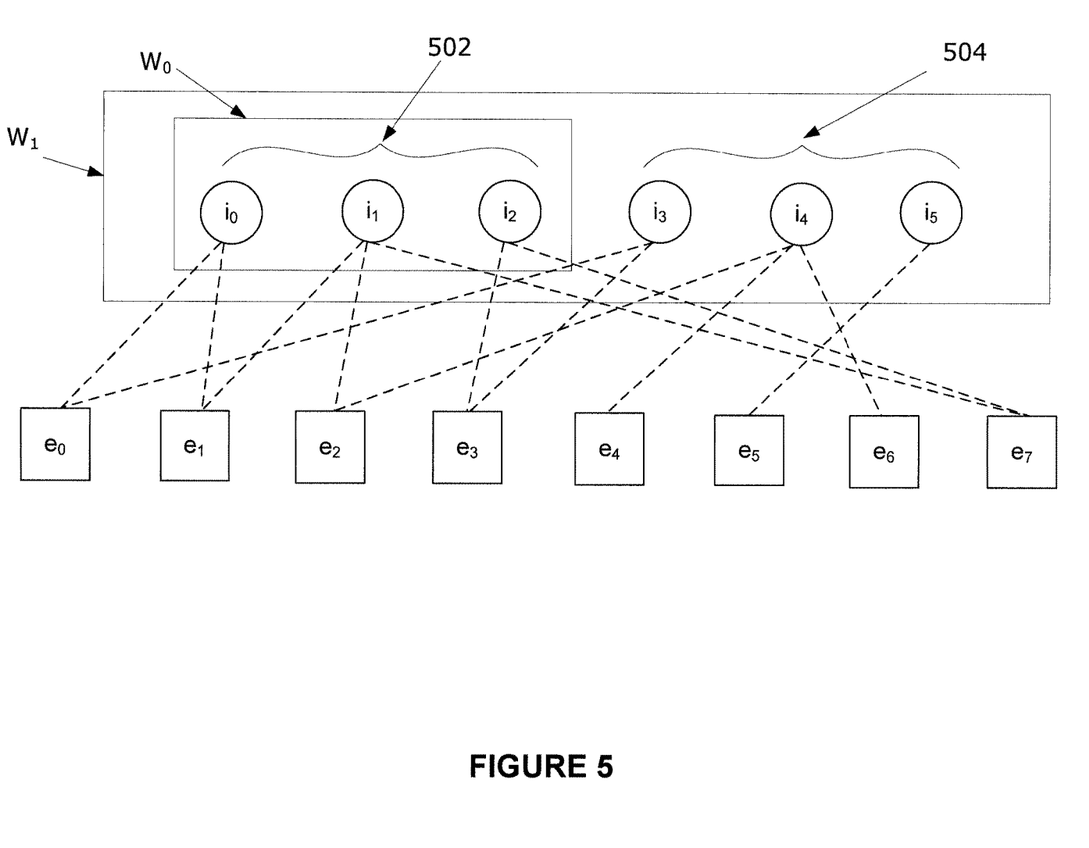
FIG. 5 is a diagram illustrating an example encoding process in accordance with one implementation of the present disclosure.
Figure 6:
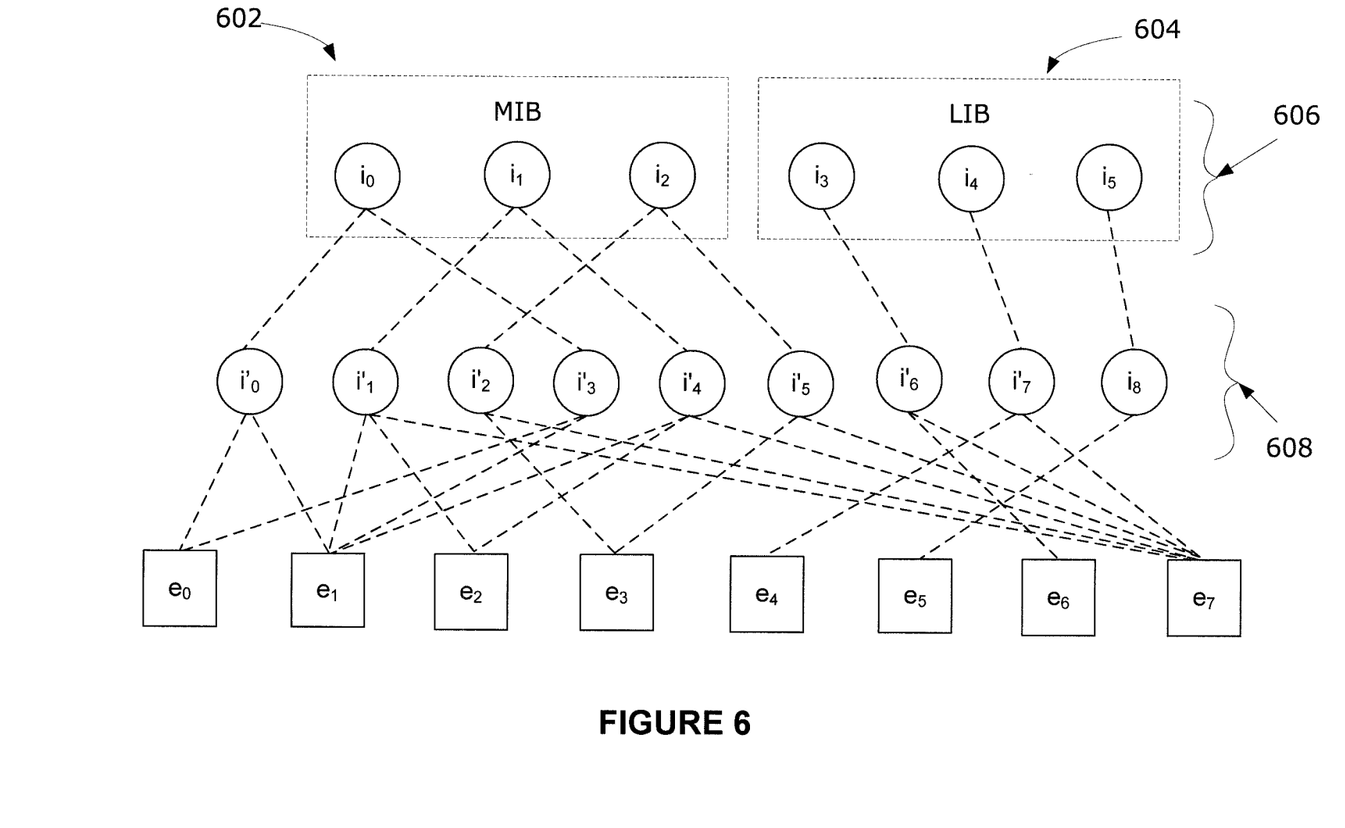
FIG. 6 is a diagram illustrating an example encoding process in accordance with one implementation of the present disclosure.

FIGS. 4, 5 and 6 illustrate different embodiments which incorporate UEP within the FEC encoding algorithm used by the FEC encoder 212 and in the encoding action 310 of the method 300. FIG. 4 illustrates an encoding method using modified equal error protection (EEP) fountain codes. The original source block of input symbols $i_0$ to $i_5$ from the SVC encoder 210 is partitioned into L blocks. For L=2 as shown, the blocks include a most important (MIB) 402 and a least important block (LIB) 404. The input symbols are represented by the circles $i_0$ to $i_5$ in the top part of FIG. 4. The encoded symbols $e_0$ to $e_7$ are represented by the squares in the bottom part of FIG. 4. The associations between input symbols and output symbols are represented by dashed lines. Thus, for example, encoded symbol $e_0$ is based on input symbols $i_0$ and $i_3$. In one embodiment, the encoded symbol $e_0$ is generated by an XOR function of the input symbols $i_0$ and $i_3$. Probabilities $p_1$ and $p_2$ are assigned to select input symbols from the MIB 402 and LIB 404 respectively such that $p_1+p_2=1$ and $p_1/|MIB|>p_2/|LIB|$. Thus, more of the information from the MIB 402 is represented in the encoded symbols as compared to information from the LIB 404. Given a suitable degree distribution $\Omega(x)=\Sigma_{i=1\ldots k}\Omega_i x^i$ on $\{1,\ldots,k\}$, the sequence of encoding symbols $e_m$ m>0 is formed according to:

a. select degree $d_m$ according to degree distribution;
    b. sequentially select $d_m$ distinct source symbols, the probability of selecting symbols from MIB or LIB being governed by $p_1$ and $p_2$ respectively; and
    c. set the encoded symbol $e_m$ equal to the modulo 2 XOR of the $d_m$ selected symbols.

In this embodiment, the scheduler 214 assigns encoded data packets for transmission over a selected wireless channel based on the importance level of the data packet as indicated, for example, by the number of MIB symbols used to form the encoded data packet. If the number of MIB symbols exceeds a threshold, the packet may be assigned for transmission over a licensed wireless channel. The threshold may be updated dynamically as described above.

FIG. 5 illustrates an encoding method using expanding window (EW) UEP fountain codes. The input symbols are represented by the circles $i_0$ to $i_5$ in the top part of FIG. 5. The encoded symbols $e_0$ to $e_7$ are represented by the squares in the bottom part of FIG. 5. The original source block of input symbols $i_0$ to $i_5$ is partitioned into L blocks. For L=2 as shown, the blocks include a most important (MIB) 502 which is designated as $B_1$, and a least important block (LIB) 504, which is designated as $B_2$. A number of windows are defined corresponding to the number of blocks. The windows $W_0,\ldots,W_{L-1}$ are defined such that window L is a concatenation of blocks $B_1, B_2, \ldots, B_L$. For each window, an LT fountain code is defined with a suitable degree distribution $\Delta_i(x)=\Sigma_{j=1\ldots i}\Delta_{i,j}x^j$ over the set $\{1, 2, \ldots, |W_i|\}$ where $|W_i|=\Sigma_{j=1\ldots i}|B_j|$. An encoded symbol is generated by selecting a window $W_i$ according to a pre-defined degree distribution $\psi(x)=\Sigma_{i=1\ldots L}\psi_i x^i$ on $\{1,\ldots,L\}$, then applying the LT fountain code defined over the selected window $W_i$. In the example illustrated in FIG. 5, encoded symbols $e_0$, $e_1$ and $e_7$ are generated from window $W_0$ while the rest of the encoded symbols $e_2$, $e_3$, $e_4$, $e_5$ and $e_6$ are generated from window $W_1$. In this embodiment, the scheduler 214 assigns encoded data packets for transmission over a selected wireless channel based on the importance level of the data packet as indicated, for example, by the number of MIB symbols used to form the encoded packet symbols. If the number of MIB symbols exceeds a threshold, the packet may be assigned for transmission over a licensed wireless channel. The threshold may be updated dynamically based on quality as described above. In some embodiments, the packet is assigned based on the window that was used to form the encoded packet.

FIG. 6 illustrates an encoding method using virtually expanded (VE) UEP fountain codes. The original source block of input symbols $i_0$ to $i_5$ is partitioned into L blocks which are adjacent blocks. For L=2 as shown, the blocks include a most important (MIB) 602 which is designated as $B_1$, and a least important block (LIB) 604, which is designated as $B_2$. In this embodiment, some of the blocks are virtually expanded by duplicating the input symbols from the original block 606. In FIG. 6, the input symbols are again represented by the circles $i_0$ to $i_5$ in the top part of FIG. 6. The duplicated or expanded input symbols (i') 608 are represented by the second row of circles labelled as $i'_0$ to $i'_8$. The encoded symbols $e_0$ to $e_7$ are represented by the squares in the bottom part of FIG. 6. In this embodiment, UEP is achieved by virtually expanding the blocks $B_1, B_2, \ldots, B_L$ according to a sequence of expansion factors $EF_1 > EF_2 > \ldots > EF_L$ respectively. In the example illustrated in FIG. 6, the MIB 602 is expanded using $EF_1=2$. The LIB 604 is not expanded since $EF_2=1$ has been applied. The degree distribution of the original LT fountain code defined over $\{1, \ldots, k\}$ is extended over $\{1, \ldots, \Sigma_{i=1 \ldots L} EF_i|B_i|\}$. An encoded symbol $e_m$ is generated by finding its degree $d_m$ using the new extended degree distribution. In this embodiment, the scheduler 214 assigns encoded data packets for transmission over a selected wireless channel based on the importance level of the data packet as indicated by the number of MIB symbols used to form the encoded packet symbols. If the number of MIB symbols exceeds a threshold, the packet may be assigned for transmission over a licensed wireless channel. The threshold may be updated dynamically as described above.

Figure 7:
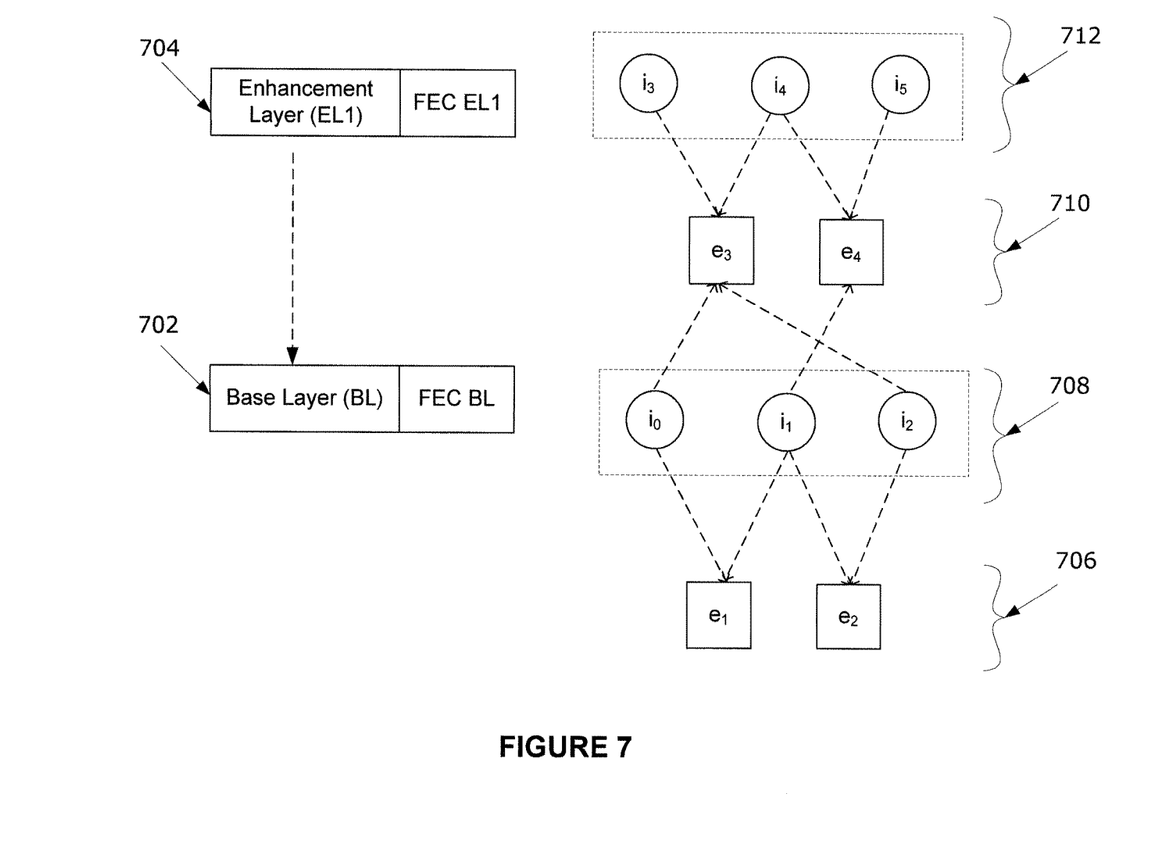
FIG. 7 is a diagram illustrating an example encoding process in accordance with one implementation of the present disclosure.

In the examples described with reference to FIGS. 4 to 6, the fountain code processes introduce the UEP within the FEC algorithm and thus may be considered "inner" UEP FEC fountain codes. FIG. 7 illustrates a layer-aware (LA) FEC approach for the FEC encoder 212 which may be considered an "outer" UEP FEC. This is referred to as outer since the processing of the SVC base layer 702 is not affected and inter-dependency between the base layer 702 and one or more enhancement layers (EL) 704 is preserved. In this embodiment, UEP is applied when generating the parity symbols for each encoded layer. The parity symbols 706 for the BL source symbols 708 depend solely on the BL source symbols 708 whereas the parity symbols 710 for the enhancement layer 1 (EL1) source symbols 712 depend on the BL source symbols 708 and the source symbols 712 for EL1. The parity symbols for the enhancement layer 2 (not shown) depend on the source symbols from BL, EL1 and EL2, and so on. As a result, the decoding of the BL can be enhanced by the reception of the ELs since more parity symbols can be used to decode the BL. Similarly, the decoding of EL1 is enhanced by the reception of EL2 since more parity symbols can be used in the decoding of EL1. Since the UEP is applied only for generating the parity symbols, the FEC processing for the BL remains unchanged and its protection level is enhanced due to the additional parity symbols on the priority layers. The additional protection for the BL comes at the expense of a reduced protection for the ELs since these layers can not be corrected independently of the BL. This embodiment may be backward compatible with existing systems and may enable the use of other fountain codes such as Raptor codes. In this embodiment, the scheduler 214 assigns encoded data packets for transmission over a selected wireless channel based on the importance level of the data packet as indicated by the layer. If the packet contains data from the base layer, the threshold may be exceeded and the packet may be assigned for transmission over a licensed wireless channel. The threshold may be updated dynamically as described above.

As noted above, the FEC encoder 212 operates at an upper layer to generate an encoded packet of video content. If implemented at the RLC layer, the encoding is agnostic to the different physical (PHY) layer and media access control (MAC) layer designs used to support communications over different licensed and unlicensed wireless channels. In some embodiments, applying fountain codes in the RLC layer may act as a replacement for a MAC layer hybrid automatic repeat request (HARQ) retransmission mechanism. Thus, signaling overhead may be reduced and energy efficiency may be increased. For an RLC layer implementation, two options are possible. In one example, fountain codes are applied on buffered RLC service data units (SDUs) before RLC segmentation and concatenation stages. In the second example, fountain codes are applied on single RLC protocol data units (PDUs) after RLC segmentation and concatenation.

Different embodiments also exist for fountain codes implemented at the application layer. For streaming delivery of video or audio content, for example, short blocks of data may be used. For content delivery, such a multimedia file download, longer blocks of data may be used. If the receiver of the user device 110 has sufficient memory, large amounts of data may be encoded as a single block. Otherwise, large amounts of data may be partitioned into a set of sub-blocks. The implementation at the application layer is also agnostic to the different physical (PHY) layer and media access control (MAC) layer designs used to support communications over different licensed and unlicensed wireless channels. In some embodiments, the application layer implementation may combine well with PHY-FEC, HARQ and RLC-layer acknowledge mode (AM) automatic repeat request (ARQ) protocols. For example, PHY-FEC/HARQ may be used to correct or retransmit corrupted packets due to interference and noise over small data blocks. The application layer implementation may also offer protection against erased packets over small to long data blocks.

Figure 8:
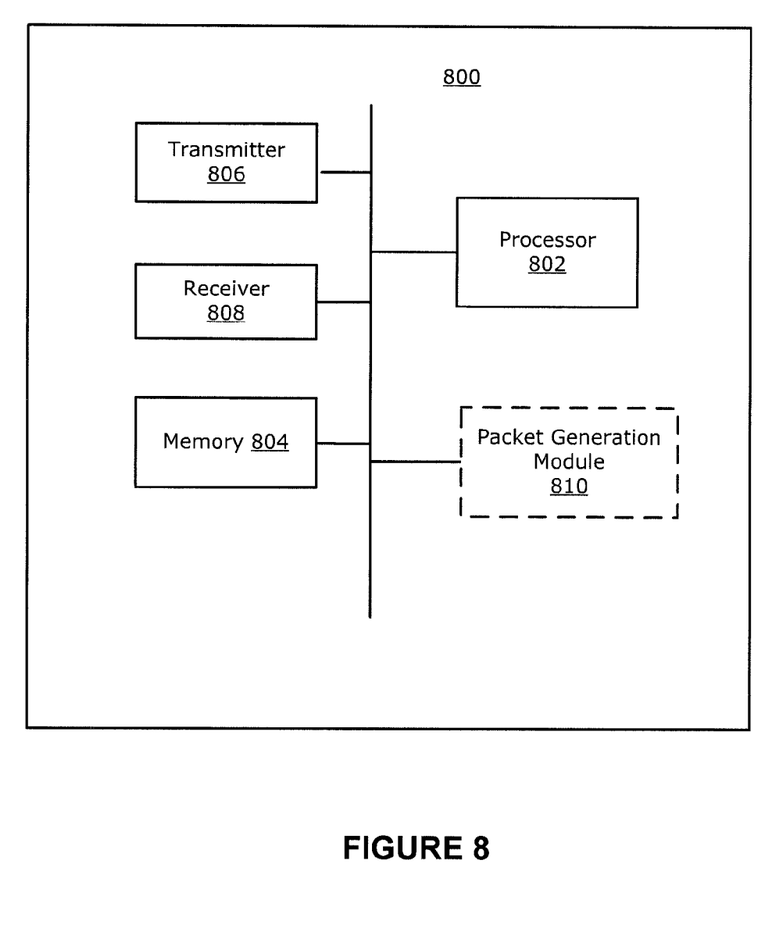
FIG. 8 is a block diagram illustrating an apparatus in accordance with one implementation of the present disclosure.

FIG. 8 illustrates an apparatus 800 according to an embodiment of the present application. The apparatus 800 may be an implementation of the user device 110. The apparatus 800 may be an implementation of the server 160, the network node 112, the LPN 140, or a user device 110 which is configured to encode and transmit video or multimedia content to one or more user devices 110. The apparatus 800 may include one or more processing devices 802, such as a processor, a microprocessor, an application-specific integrated circuit (ASIC), a field-programmable gate array (FPGA), a dedicated logic circuitry, or combinations thereof. The apparatus 800 may have a memory 804. The memory 804 may include a volatile or non-volatile memory (e.g., a flash memory, a random access memory (RAM), and/or a read-only memory (ROM)). The memory 804 may consist of a transitory computer readable media such as a RAM, a ROM, an erasable programmable ROM (EPROM), an electrically erasable programmable ROM (EEPROM), a flash memory, a CD-ROM, or other portable memory storage. The memory 804 may store instructions for execution by the processing device(s) 802, such as to carry out the present disclosure.

In some embodiments, the apparatus 800 includes a transmitter 804 that is configured to send video or multimedia data packets as described herein. In some embodiments the apparatus 800 includes a receiver 808 that is configured to receive video or multimedia data packets. While only a single transmitter 804 and receiver 808 are shown in FIG. 8, the apparatus 800 includes multiple transmitter and receiver components in order for the apparatus 800 to support different communication interfaces for the wireless networks 102, 104 as described above.

In some embodiments, such as for a server 160 or a user device 110 which is configured to encode and transmit video or multimedia content, the apparatus 800 includes a packet generation module 810. The packet generation module 810 encodes video or multimedia content as described herein. The packet generation module 810 may be implemented as a separate hardware module or as part of the transmitter 804. Alternatively, the packet generation module 810 may be a software module which is stored in the memory 804 and executed by the processor 802.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, or simultaneously, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for transmitting multimedia content, comprising:
    encoding a block of input symbols using upper layer rateless forward error correction (FEC) codes to generate a plurality of encoded packets, the input symbols representing a higher-importance layer and one or more lower-importance layers of scalable encoded multimedia content;
    the plurality of encoded packets having unequal error protection (UEP), to increase representation of the higher-importance layer in the encoded packets compared to representation of the one or more lower-importance layers, at least a first encoded packet representing both data from the higher-importance layer and data from at least one lower-importance layer; and
    transmitting each of the plurality of encoded packets over a selected one of a plurality of wireless channels, wherein, for at least the first encoded packet, a wireless channel is selected based on whether or not data represented in the first encoded packet includes an amount of data from the higher-importance layer that exceeds a threshold.

2. The method of claim 1 wherein the higher-importance layer is a base layer and the one or more lower-importance layers is one or more enhancement layers of the scalable encoded multimedia content.

3. The method of claim 1 further comprising varying the threshold based on signal quality conditions of the plurality of wireless channels, quality of service (QoS) requirements of the multimedia content, QoS requirements of a user device, quality of experience (QoE) requirements of a user device, or combinations thereof.

4. The method of claim 3 further comprising transmitting an indication of the threshold over one of the plurality of wireless channels.

5. The method of claim 1 wherein the upper layer rateless FEC codes provide UEP during encoding.

6. The method of claim 5 wherein the upper layer rateless FEC codes are generated using one of a modified equal error protection (EEP) fountain code, an expanding window (EW) UEP fountain code, or a virtually expanded UEP fountain code.

7. The method of claim 5 wherein the upper layer rateless FEC codes comprise Luby Transform (LT) fountain codes or Raptor codes.

8. The method of claim 1 wherein the upper layer rateless FEC codes further comprise layer-aware (LA) FEC codes and parity symbols generated with UEP.

9. The method of claim 8 further comprising transmitting an indication of one or more respective layers associated with each of the plurality of encoded packets.

10. The method of claim 1 wherein the threshold comprises a predetermined number of input symbols representing the higher-importance layer.

11. The method of claim 1 wherein transmitting each of the plurality of encoded packets over a selected one of a plurality of wireless channels comprises transmitting each of the plurality of encoded packets for broadcast or multicast transmission to a plurality of user devices.

12. The method of claim 11 further comprising transmitting one of the plurality of encoded packets to the plurality of user devices until an acknowledgement is received from each of the plurality of user devices for the block of input symbols.

13. The method of claim 1 wherein the plurality of wireless channels comprise a licensed channel supporting wireless communications over licensed spectrum and an unlicensed channel supporting wireless communications over unlicensed spectrum, and wherein, for at least the first encoded packet, the licensed channel is selected when the data represented in the first encoded packet includes an amount of data from the higher-importance layer that exceeds the threshold, and the unlicensed channel is selected when the data represented in the first encoded packet does not include an amount of data from the higher-importance layer that exceeds the threshold.

14. The method of claim 13 wherein encoded packets are transmitted over the licensed channel using a cellular communications protocol and wherein encoded packets are transmitted over the unlicensed channel using the cellular communications protocol.

15. The method of claim 13 wherein encoded packets are transmitted over the licensed channel using a cellular communications protocol and wherein encoded packets are transmitted over the unlicensed channel using a wireless local area network (WLAN) communications protocol.

16. The method of claim 1 wherein the encoding is performed in a radio link control (RLC) layer.

17. The method of claim 1 wherein the encoding is performed in an application layer (AL).

18. An apparatus for transmitting multimedia content over a plurality of wireless communications channels, the apparatus comprising:
a processor configured to execute instructions to:
encode a block of input symbols using upper layer rateless forward error correction (FEC) codes to generate a plurality of encoded packets, the input symbols representing a higher-importance layer and one or more lower-importance layers of scalable encoded multimedia content;
the plurality of encoded packets having unequal error protection (UEP), to increase representation of the higher-importance layer in the encoded packets compared to representation of the one or more lower-importance layers, at least a first encoded packet representing both data from the higher-importance layer and data from at least one lower-importance layer; and
assign each of the plurality of encoded packets to a respective selected one of a plurality of wireless channels, wherein, at least the first encoded packet is assigned to a selected wireless channel based on whether or not data represented in the first encoded packet includes an amount of data from the higher-importance layer that exceeds a threshold; and
a transmitter configured to transmit each encoded packet over the respective selected wireless channel.

19. The apparatus of claim 18 wherein the higher-importance layer is a base layer and the one or more lower-importance layers is one or more enhancement layers of the scalable encoded multimedia content.

20. The apparatus of claim 18 wherein the processor is further configured to vary the threshold based on signal quality conditions of the plurality of wireless channels, quality of service (QoS) requirements of the multimedia content, QoS requirements of a user device, quality of experience (QoE) requirements of a user device, or combinations thereof.

21. The apparatus of claim 20 wherein the transmitter is configured to transmit an indication of the threshold over one of the plurality of wireless channels.

22. The apparatus of claim 18 wherein the upper layer rateless FEC codes provide UEP during encoding.

23. The apparatus of claim 22 wherein the upper layer rateless FEC codes are generated using one of a modified equal error protection (EEP) fountain code, an expanding window (EW) UEP fountain code, or a virtually expanded UEP fountain code.

24. The apparatus of claim 18 wherein the upper layer rateless FEC codes further comprise layer-aware (LA) FEC codes and parity symbols generated with UEP.

25. The apparatus of claim 24 wherein the transmitter is configured transmit an indication of one or more respective layers associated with each of the plurality of encoded packets.

26. The apparatus of claim 18 wherein the threshold comprises a number of input symbols representing the higher-importance layer.

27. The apparatus of claim 18 wherein the transmitter is configured to transmit encoded packets over a licensed channel supporting wireless communications over licensed spectrum and an unlicensed channel supporting wireless communications over unlicensed spectrum, and wherein the processor is configured to assign at least the first encoded packet to the licensed channel when data represented in the first encoded packet includes an amount of data from the higher-importance layer that exceeds the threshold, and to assign the first encoded packet to the unlicensed channel when data represented in the first encoded packet does not include an amount of data from the higher-importance layer that exceeds the threshold.

28. The apparatus of claim 27 wherein the transmitter is configured to:
transmit encoded packets over the licensed channel using a cellular communications protocol, and
transmit encoded packets over the unlicensed channel using the cellular communications protocol.

29. The apparatus of claim 27 wherein the transmitter is configured to:
transmit encoded packets over the licensed channel using a cellular communications protocol, and
transmit encoded packets over the unlicensed channel using a wireless local area network (WLAN) communications protocol.

30. The apparatus of claim 18 wherein the transmitter is configured to transmit each encoded packet over the respective selected wireless channel for broadcast or multicast transmission to a plurality of user devices, and wherein the transmitter is configured to transmit the plurality of encoded packets to the plurality of user devices until an acknowledgement is received from each of the plurality of user devices for the block of input symbols.

* * * * *